(12) United States Patent
Katou (10) Patent No.: US 7,212,106 B2
(45) Date of Patent: May 1, 2007

(54) TRIGGER DEVICE FOR TIRE CONDITION MONITORING APPARATUS

(75) Inventor: Michiya Katou, Ichinomiya (JP)

(73) Assignee: Pacific Industrial Co., Ltd. (JP)

( * ) Notice: Subject to any disclaimer, the term of this patent is extended or adjusted under 35 U.S.C. 154(b) by 217 days.

(21) Appl. No.: 10/971,886

(22) Filed: Oct. 22, 2004

(65) Prior Publication Data
US 2005/0093687 A1 May 5, 2005

(30) Foreign Application Priority Data
Oct. 29, 2003 (JP) .............................. 2003-368992

(51) Int. Cl.
*B60C 23/00* (2006.01)
(52) U.S. Cl. ...................................... 340/447
(58) Field of Classification Search ................ 340/442, 340/447
See application file for complete search history.

(56) References Cited

U.S. PATENT DOCUMENTS

| 5,764,138 A | 6/1998 | Lowe ......................... 340/447 |
| 6,257,289 B1 * | 7/2001 | Tomita et al. ............ 152/152.1 |
| 8,879,935 * | 4/2005 | Keck ........................... 702/168 |
| 2002/0113692 A1 * | 8/2002 | Normann et al. ........... 340/442 |
| 2005/0007251 A1 * | 1/2005 | Crabtree et al. ........ 340/539.13 |

FOREIGN PATENT DOCUMENTS

| EP | 0 639 472 A1 | 2/1995 |
| EP | 1 026 015 A2 | 8/2000 |
| JP | 2001-174357 | 6/2001 |
| JP | 2003-272060 | 9/2003 |

\* cited by examiner

*Primary Examiner*—Jeffery Hofsass
*Assistant Examiner*—Shirley Lu
(74) *Attorney, Agent, or Firm*—Fish & Richardson P.C.

(57) ABSTRACT

A tire condition monitoring apparatus includes a transmitter located in a tire of a vehicle. A trigger device includes a transmission antenna, a reception antenna, and an antenna unit. The transmission antenna wirelessly transmits a trigger signal. The transmitter wirelessly transmits data indicating the tire condition in response to the trigger signal. The reception antenna receives the data wirelessly transmitted from the transmitter. The antenna unit incorporates the transmission antenna and the reception antenna. Therefore, the trigger device reliably receives data wirelessly transmitted from the transmitter.

13 Claims, 5 Drawing Sheets

TRIGGER DEVICE FOR TIRE CONDITION MONITORING APPARATUS

BACKGROUND OF THE INVENTION

The present invention relates to a trigger device of a tire condition monitoring apparatus. More particularly, the present invention pertains to a trigger device for a wireless tire condition monitoring apparatus that permits a driver in a vehicle passenger compartment to check conditions of tires, such as the air pressure.

Wireless tire condition monitoring apparatuses that allow a driver in a vehicle passenger compartment to check the conditions of vehicle tires have been proposed. The apparatus includes transmitters and a receiver. Each transmitter is located in the wheel of one of the tires and the receiver is located in the body frame of the vehicle. Each transmitter detects the conditions, such as air pressure and the temperature of the associated tire, and wirelessly transmits data representing the detected conditions. The receiver receives data wirelessly transmitted by the transmitters with a reception antenna and displays the conditions of the tires, for example, on a display located in front of the driver's seat.

Each transmitter is accommodated in a case provided in a tire valve. The tire valve is fitted in a valve hole of the corresponding wheel. Accordingly, the case, which accommodates the transmitter, is located in the corresponding tire (see Japanese Laid-Open Patent Publication No. 2001-174357).

A unique ID code is registered in an internal memory, for example, a ROM, of the transmitter. The ID code is used to distinguish the associated transmitter from the other three transmitters (see Japanese Laid-Open Patent Publication No. 2003-272060).

Each transmitter wirelessly transmits the ID code and the data representing the condition of the associated tire in response to a trigger signal from the trigger device. Heavy vehicles such as buses and trucks often use double tires for the rear wheels. Therefore, even if a trigger device is brought close to one of the tires of the double tire and a trigger signal is transmitted, the transmitters in both tires might respond to the trigger signal. As a result, the transmitters in both tires wirelessly transmit data representing the ID code and the condition of the associated tire at the same time. This causes the interference between the data from the transmitters. Therefore, the trigger device sometimes failed to receive data from the transmitter located in the tire to which the trigger device is brought close.

SUMMARY OF THE INVENTION

Accordingly, it is an objective of the present invention to provide a trigger device of a tire condition monitoring apparatus that reliably receives data wirelessly transmitted from a transmitter.

To achieve the above-mentioned objective, the present invention provides a trigger device for a tire condition monitoring apparatus. The monitoring apparatus includes a transmitter located in a tire of a vehicle. The trigger device includes a transmission antenna for wirelessly transmitting a trigger signal. The transmitter wirelessly transmits data indicating the tire condition in response to the trigger signal. A reception antenna receives the data wirelessly transmitted from the transmitter. An antenna unit incorporates the transmission antenna and the reception antenna.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be described.

Figure 1:
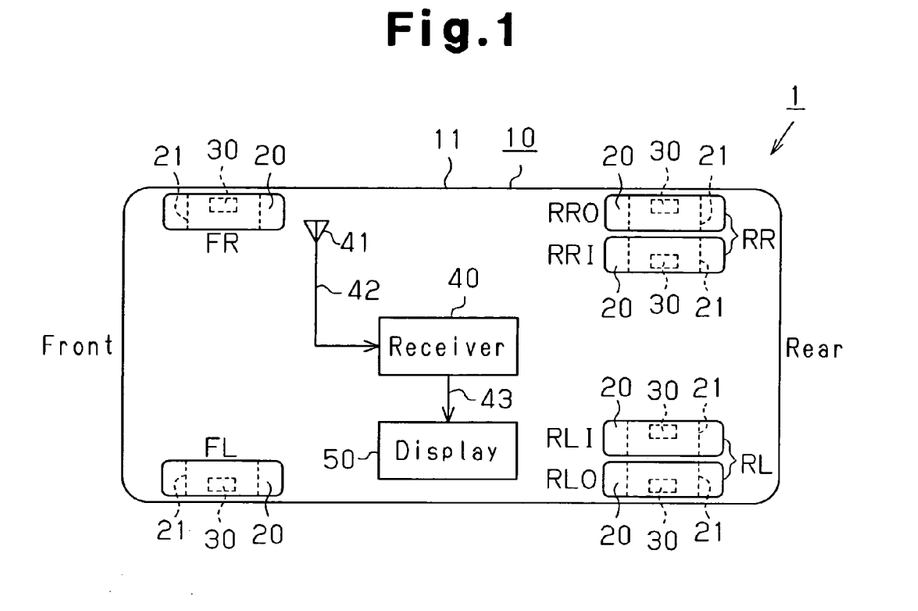
FIG. 1 is a block diagram showing a tire condition monitoring apparatus according to the present invention.

As shown in FIG. 1, the tire condition monitoring apparatus 1 includes six transmitters 30 and a single receiver 40. Each of the transmitters 30 is associated with a different one of six tires 20 of a vehicle 10. The receiver 40 is installed in a body frame 11 of the vehicle 10.

The vehicle 10 has left and right front tires 20 (FL, FR) and left and right rear tires 20 (RL(RLI, RLO), RR(RRI, RRO)). The left and right rear wheels have so-called double tires.

Each transmitter 30 is fixed to a wheel 21 of one of the tires 20 such that the transmitter 30 is located in the associated tire 20. More specifically, each transmitter 30 is accommodated in a case (not shown) provided below a tire valve (not shown). Each tire valve is fitted in a valve hole (not shown) of the corresponding wheel 21. Therefore, each transmitter 30 is fixed at the inside of the corresponding tire 20. Each transmitter 30 measures the condition of the corresponding tire 20, that is, the pressure and the temperature of the tire 20. The transmitter 30 then wirelessly transmits data containing air pressure data and temperature data obtained from the measurement.

The receiver 40 is located at a predetermined position on the body frame 11 and is activated by electricity of a battery (not shown) of the vehicle 10. A reception antenna 41 is connected to the receiver 40 with a cable 42. The receiver 40 receives data wirelessly transmitted by the transmitters 30 through the reception antenna 41. A display 50 is located in the view of the driver of the vehicle 10, for example, in the passenger compartment. The display 50 is connected to the receiver 40 with a cable 43.

Figure 2:
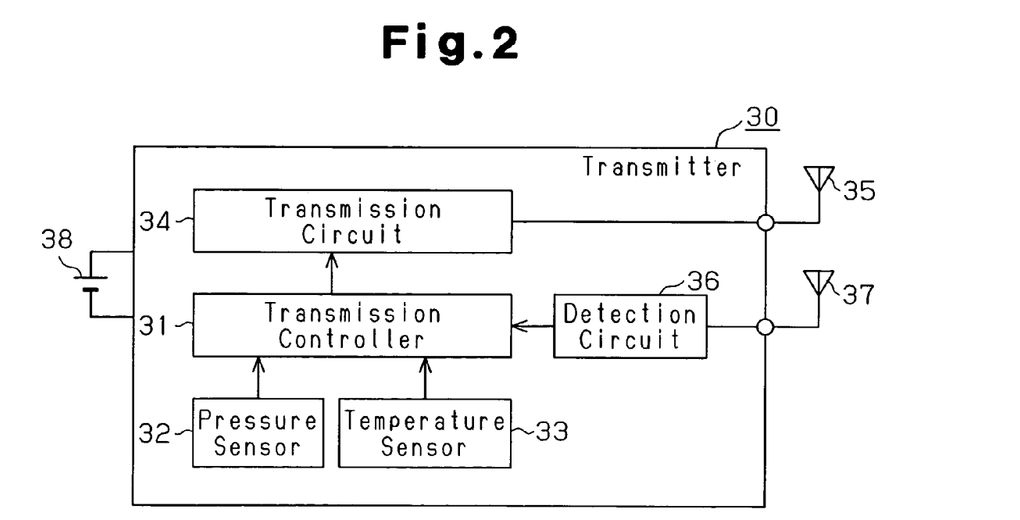
FIG. 2 is a block diagram showing a transmitter incorporated in the monitoring apparatus shown in FIG. 1.

With reference to FIG. 2, each transmitter 30 has a transmission controller 31, which is, for example, a microcomputer. The transmission controller 31 includes, for example, a central processing unit (CPU), a read only memory (ROM), and a random access memory (RAM). A unique ID code is registered in an internal memory, for example, the ROM, of the transmission controller 31. The ID code is used to distinguish the associated transmitter 30 from the other five transmitters 30.

A tire pressure sensor 32 measures the air pressure in the interior of the associated tire 20 and provides the transmission controller 31 with pressure data, which is obtained from the measurement. A temperature sensor 33 measures the temperature in the interior of the associated tire 20 and provides the transmission controller 31 with temperature data, which is obtained from the measurement.

Each transmission controller 31 sends the air pressure data, the temperature data, and the registered ID code to a transmission circuit 34. The transmission circuit 34 encodes and modulates the data sent from the transmission controller 31. The transmission circuit 34 then wirelessly sends the data through a transmission antenna 35.

A detecting circuit 36 detects a trigger signal received with a reception antenna 37. When the detecting circuit 36 detects a trigger signal sent from the trigger device 100, which will be described later, the detecting circuit 36 sends a signal indicating the detection of the trigger signal to the transmission controller 31. Each transmitter 30 is provided with a battery 38. The transmitter 30 is driven by electricity of the battery 38.

Figure 3:
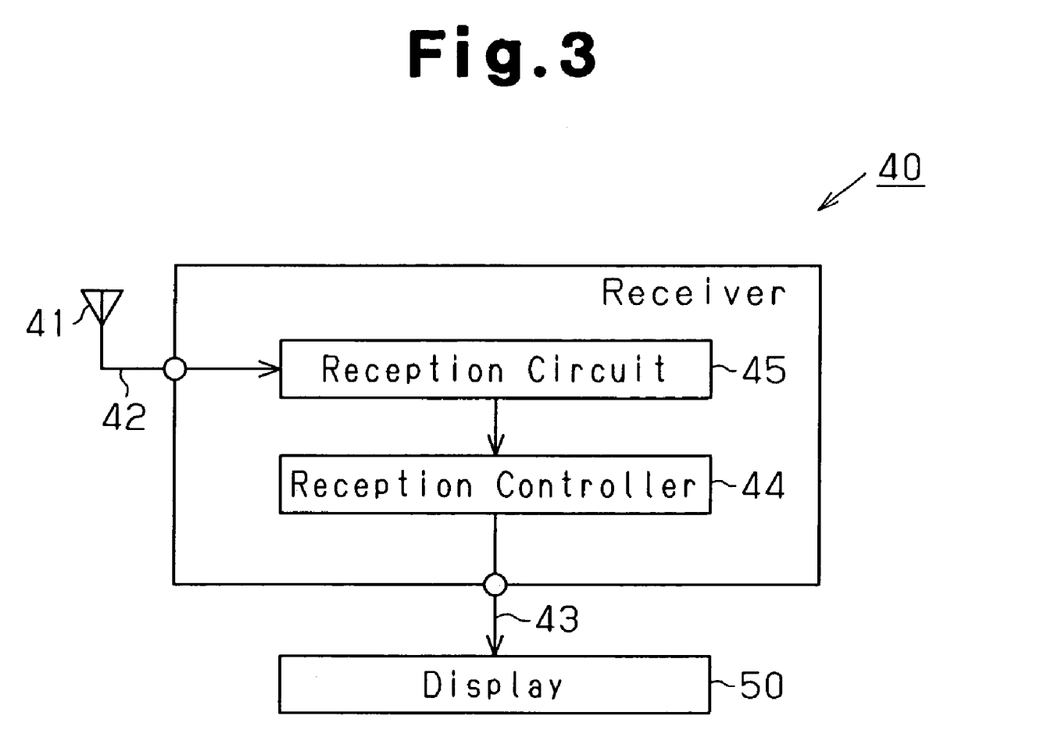
FIG. 3 is a block diagram showing a receiver incorporated in the monitoring apparatus shown in FIG. 1.

As shown in FIG. 3, the receiver 40 includes a reception controller 44 and a reception circuit 45. The reception controller 44 processes data received with the reception antenna 41. The reception controller 44, which is, for example, a microcomputer, includes a CPU, a ROM, and a RAM. The reception circuit 45 receives data transmitted by the transmitters 30 through the reception antenna 41. The reception circuit 45 demodulates and decodes the received data and sends the data to the reception controller 44.

Based on the received data, the reception controller 44 obtains the internal pressure and the temperature of the tire 20 that are associated with the transmitter 30 that is the source of the received data. The reception controller 44 also causes the display 50 to show data regarding the air pressure and the temperature. Particularly, when there is an abnormality in the internal pressure or the temperature of the tire 20, the reception controller 44 displays warning on the display 50. The receiver 40 is activated when a key switch (not shown) of the vehicle 10 is turned on.

Figure 4:
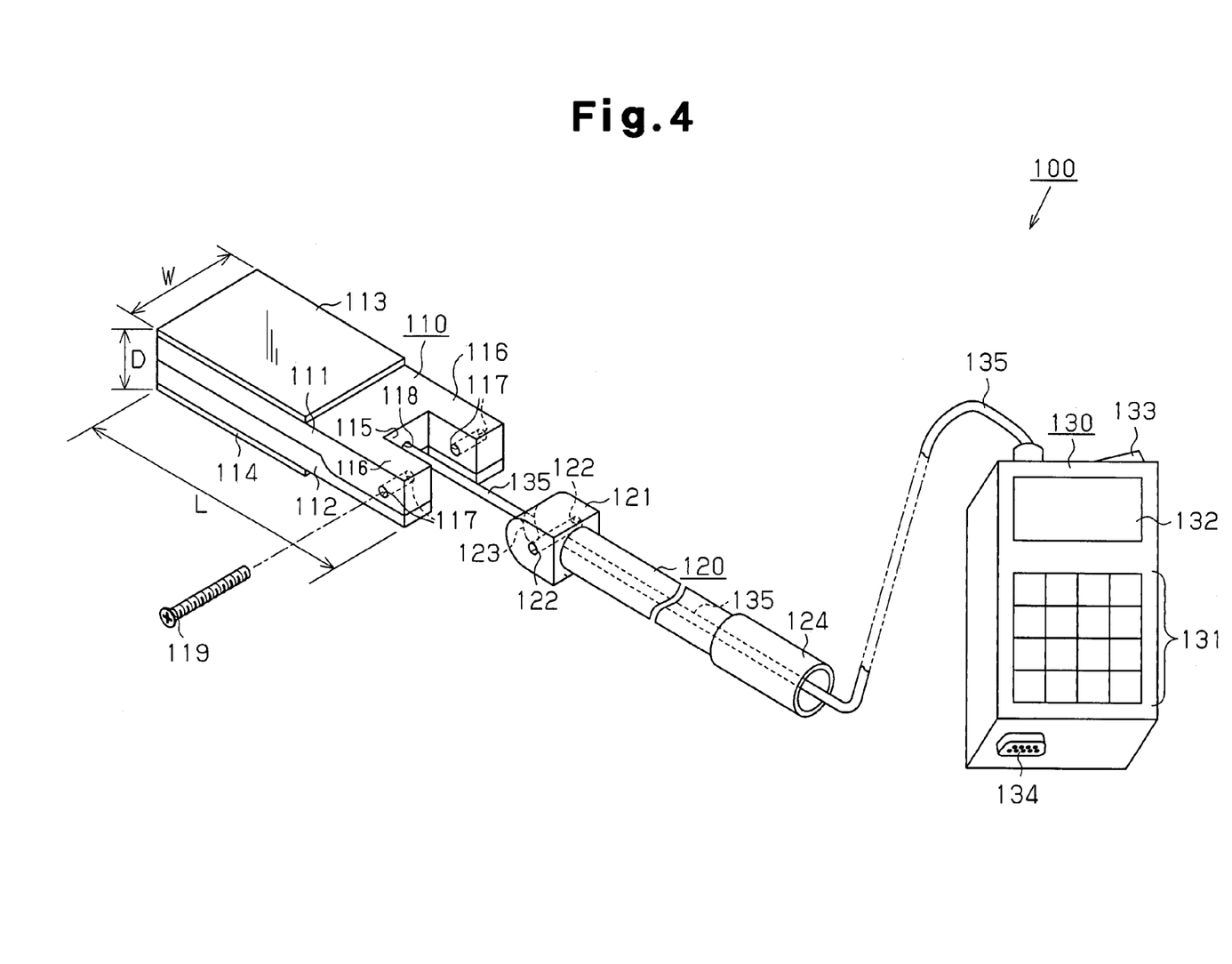
FIG. 4 is a perspective view illustrating a trigger device for the monitoring apparatus shown in FIG. 1.

As shown in FIG. 4, the trigger device 100 includes an antenna unit 110, a support portion 120, and a main body 130. The trigger device 100 is portable.

The antenna unit 110 includes an upper case 111 and a lower case 112. Mirrors 113, 114 are respectively attached to the opposing outer surfaces of the upper case 111 and the lower case 112. The antenna unit 110, which includes the mirrors 113, 114, has the length L, the width W, and the thickness D. A recess 115 is formed in the upper case 111 and the lower case 112. As a result, a pair of projections 116 are formed on the upper case 111 and the lower case 112. The pair of projections 116 each have a threaded bore 117. A cable hole 118 is provided on the bottom surface of the recess 115.

The support portion 120 is formed of cylindrical synthetic resin. The support portion 120 has a rod-like form so that an operator can hold it. The support portion 120 has a substantially rectangular coupling portion 121, the distal end of which is formed arcuate. A threaded bore 122 is formed at the center of the sidewall of the coupling portion 121. An elongated cable hole 123 is formed in the arcuate distal end of the coupling portion 121.

When coupling the antenna unit 110 with the support portion 120, the coupling portion 121 is inserted in the recess 115 and the threaded bores 117 of the projections 116 are aligned with the threaded bore 122 of the coupling portion 121. When a screw 119 is tightened to the threaded bores 117, 122, the antenna unit 110 is rotatably supported by the support portion 120. That is, the antenna unit 110 is rotatably supported at the distal end of the support portion 120. As a result, the angle of the antenna unit 110 with respect to the support portion 120 is freely adjusted. The support portion 120 includes a gripper 124, which is hold when the antenna 110 is brought close to one of the tires 20.

The main body 130 includes a keyboard 131 for entering numerals and alphabets and a liquid crystal panel 132 for displaying the numerals entered with the keyboard 131. The main body 130 also includes a switch 133 for switching on and off the power source of the trigger device 100 and an RS-232C connector 134 for transmitting data to and from an external device such as a personal computer. The RS-232C connector 134 is a D-Sub 25-pin connector or a D-Sub 9-pin connector (in this embodiment a D-Sub 9-pin connector is employed). The proper name for RS-232C is TIA/EIA-232-E. However, RS-232 standard is still generally used in these days. The main body 130 is connected to the antenna unit 110 with a cable 135. That is, the cable 135 extends from the antenna unit 110 to the main body 130. The antenna unit 110 and the support portion 120 can be moved apart from the main body 130. The cable 135 is connected to the antenna unit 110 extending from the main body 130 through the cylindrical support portion 120.

Figure 5:
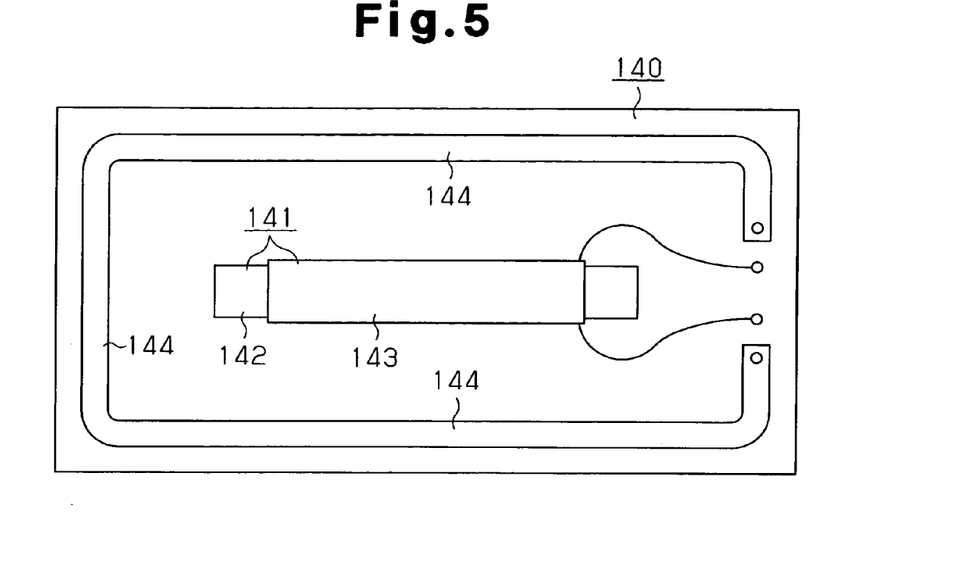
FIG. 5 is a plan view illustrating a transmission antenna and a reception antenna incorporated in the trigger device shown in FIG. 4.

A substrate 140 shown in FIG. 5 is located in the antenna unit 110 shown in FIG. 4. A transmission antenna 141 is located at the center of the substrate 140 and wirelessly transmits a trigger signal having a low frequency (LF), for example, a frequency of 125 kHz. The transmission antenna 141 is a so-called ferrite bar antenna, which includes a ferrite 142 and a coil 143 wound about the ferrite 142. A reception antenna 144 is located at the periphery of the substrate 140 and receives data having an ultra high frequency (UHF), for example, a frequency of 315 kHz, wirelessly transmitted from the transmitters 30. The reception antenna 144 is etched into the substrate 140. Therefore, the antenna unit 110 integrally accommodates the transmission antenna 141, which wirelessly transmits a trigger signal to each transmitter 30, and the reception antenna 144, which receives data that is wirelessly transmitted from the transmitter 30 based on detection of the trigger signal. In other words, the antenna unit 110 incorporates the transmission antenna 141 and the reception antenna 144. The transmission antenna 141 transmits a long wave and the reception antenna 144 receives a short wave.

Figure 6:
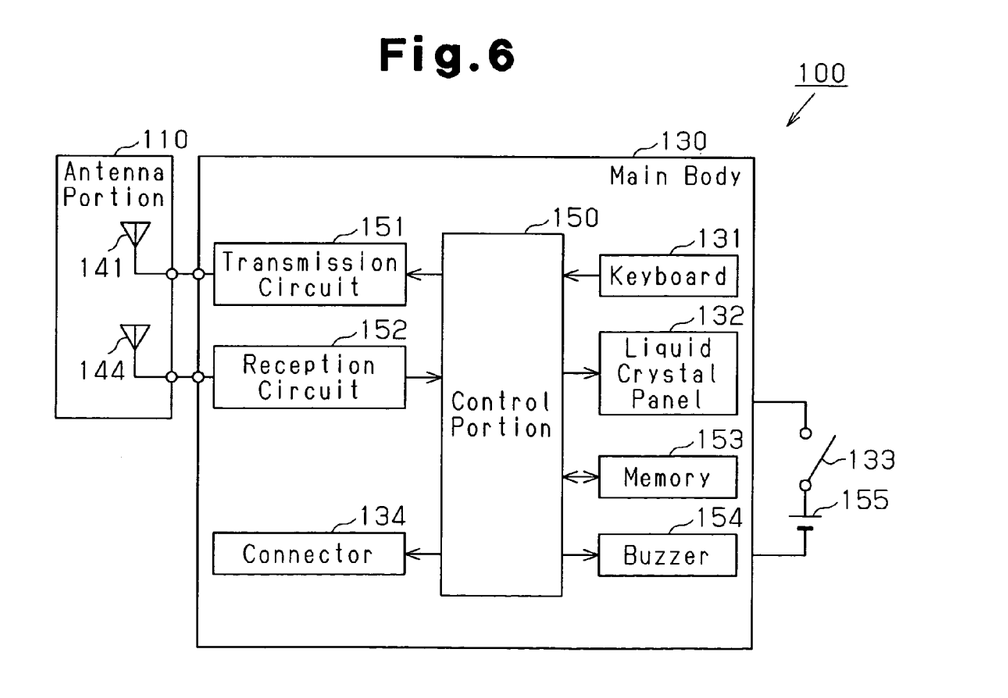
FIG. 6 is a block diagram showing the trigger device of FIG. 4.

As shown in FIG. 6, the trigger device 100 includes a control portion 150, which is a microcomputer. The control portion 150 includes a CPU, a ROM, and a RAM and controls the trigger device 100. When the switch 133 is switched on, the trigger device 100 is activated.

When a predetermined manipulation is performed on the keyboard 131, the control portion 150 transmits a control signal, which indicates to wirelessly transmit a trigger signal, to a transmission circuit 151. The transmission circuit 151 generates a trigger signal and then encodes and modulates the generated trigger signal. The transmission circuit 151 then wirelessly sends the trigger signal through the transmission antenna 141. A reception circuit 152 receives data wirelessly transmitted by the transmitters 30 through the reception antenna 144. The reception circuit 152 demodulates and decodes the received data and sends the data to the control portion 150.

The control portion 150 displays, on the liquid crystal panel 132, the ID code and the data regarding the tire 20 included in the received data, for example, the air pressure data, the temperature data, and the data indicating the position of the tire 20 and transmits the data to a memory 153. The memory 153 stores the ID code and the data regarding the tire 20. If the received data, for example, the pressure data or the temperature data exceeds a tolerable range set in advance, the control portion 150 causes a buzzer 154 to sound a warning. That is, if the control portion 150 determines that the state of the tire 20 is abnormal based on the data received from the reception antenna 144, the buzzer 154 functions as an informing device for informing the abnormality.

When a predetermined manipulation is performed on the keyboard 131, the control portion 150 transmits data to and receives data from the external device via the connector 134. The main body 130 is provided with a battery 155. The trigger device 100 is driven by electricity of the battery 155.

The method for using the trigger device 100 will now be described.

A method for bringing the antenna unit 110 close to one of the transmitters 30 will now be described.

Figure 7:
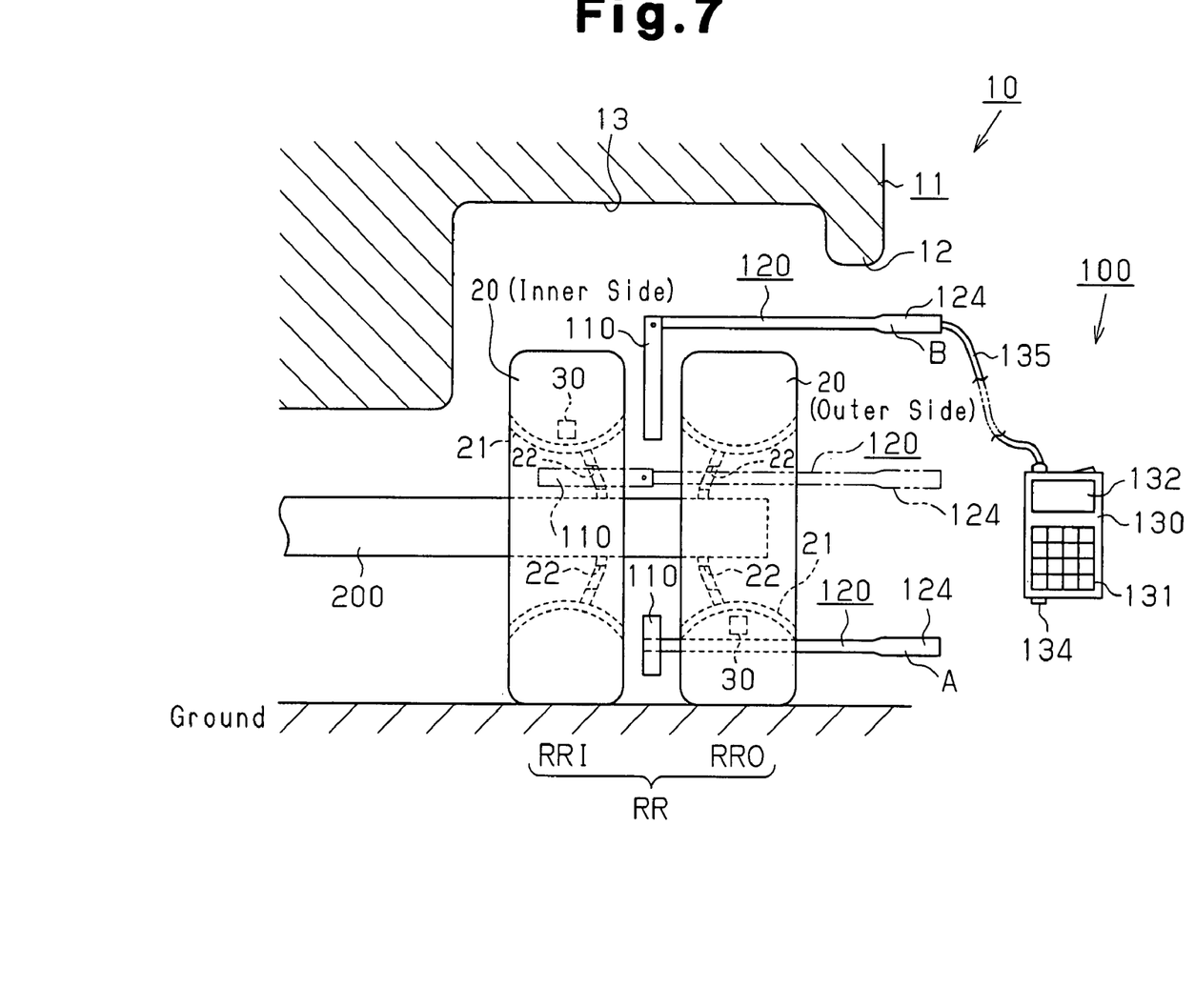
FIG. 7 is an explanatory diagram showing a case where the trigger device of FIG. 4 is used for a vehicle including double tires.

As shown in FIG. 7, the right rear tire 20 (RR), which is provided with a double tire, includes a rear inner tire 20 (RRI) and a rear outer tire 20 (RRO). The rear inner tire 20 (RRI) and the rear outer tire 20 (RRO) are attached to an axle 200 such that the transmitter 30 of the rear inner tire 20 (RRI) is located furthest from the transmitter 30 of the rear outer tire 20 (RRO). The left rear tire 20 (RL), which is provided with a double tire, also has the same structure.

When using the trigger device 100, the antenna unit 110 is brought close to the transmitter 30 attached to one of the tires 20. When bringing the antenna unit 110 close to the transmitter 30 attached to the rear inner tire 20 (RRI) of the vehicle 10, an operator first bends the antenna unit 110 at a right angle with respect to the support portion 120. Then, the operator grips the gripper 124 of the support portion 120 and moves the antenna 110 inward of the vehicle 10. Subsequently, the operator brings the antenna unit 110 between the rear inner tire 20 (RRI) and the rear outer tire 20 (RRO).

More specifically, each transmitter 30 is accommodated in the case provided below the corresponding tire valve (not shown). Therefore, the tire valve of the rear outer tire 20 (RRO) gives an indication that the transmitter 30 located in the rear inner tire 20 (RRI) is located at the position of the rear inner tire 20 (RRI) furthest from the tire valve of the rear outer tire 20 (RRO). Thus, with reference to the tire valve of the rear outer tire 20 (RRO), the antenna unit 110 can be brought close to the transmitter 30 located in the rear inner tire 20 (RRI).

The mirrors 113, 114 are attached to the opposing outer surfaces of the antenna unit 110. Therefore, when the antenna unit 110 is located between the rear inner tire 20 (RRI) and the rear outer tire 20 (RRO), damages on the tires 20 can be checked while checking the position of the antenna unit 110. Accordingly, using the trigger device 100, the appearance of the tires 20 can be visually checked besides obtaining the ID code and the data regarding the tire 20. In addition, the presence of the valve cap of the rear inner tire 20 (RRI) can be checked using the mirrors 113, 114 attached to the antenna unit 110.

However, the clearance between the tire 20 and a fender 12, or, the clearance between the tire 20 and a tire house 13 might be shorter than then length L of the antenna unit 110. In these cases, the antenna unit 110 cannot be brought between the rear inner tire 20 (RRI) and the rear outer tire 20 (RRO) with the antenna unit 110 bent at a right angle with respect to the support portion 120 directly through the clearance between the tire 20 and a fender 12, or, the clearance between the tire 20 and a tire house 13.

Therefore, the operator places the antenna unit 110 between the axle 200 and the ground with the antenna unit 110 bent at a right angle with respect to the support portion 120. Subsequently, the operator moves the antenna unit 110 inward of the vehicle 10. The operator then places the antenna unit 110 between the rear inner tire 20 (RRI) and the rear outer tire 20 (RRO), which is a position A shown in FIG. 7. After that, the operator moves the support portion 120 along the outer circumference of the rear outer tire 20 (RRO). When the antenna unit 110 is moved to the position corresponding to the transmitter 30 located in the rear inner tire 20 (RRI), the antenna unit 110 is brought close to the transmitter 30 located in the rear inner tire 20 (RRI), which is a position B shown in FIG. 7.

The wheel 21 of each tire 20 sometimes has a through hole 22 to reduce the weight of the wheel 21 or in consideration of the design of the wheel 21. When the inner diameter of the through hole 22 is greater than the width W of the antenna unit 110 (in this embodiment, width W is greater than the thickness D) and the position of the through hole 22 of the wheel 21 of the rear outer tire 20 (PRO) matches the position of the through hole 22 of the wheel 21 of the rear inner tire 20 (PRI), the antenna unit 110 may be inserted through the through holes 22 of the outer and inner wheels 21 to bring the antenna unit 110 close to the transmitter 30 of the rear inner tire 20. More specifically, as shown by a chain double-dashed line in FIG. 7, the antenna unit 110 is aligned with the support portion 120. In this case, the operator grips the gripper 124 of the support portion 120 and inserts the antenna unit 110 into the through hole 22 of the wheel 21 of the tire 20 located outward of the vehicle 10. Subsequently, the operator inserts the antenna unit 110 into the through hole 22 of the wheel 21 of the tire 20 located inward of the vehicle 10. Accordingly, the antenna unit 110 is brought close to the transmitter 30.

The operation transmitting a trigger signal from the antenna unit 110 of the trigger device 100 and receiving the data wirelessly transmitted from the transmitter 30 to which the antenna unit 110 is brought close will now be described.

When a predetermined manipulation is performed on the keyboard 131 after the antenna unit 110 is brought close to the transmitter 30, the transmission circuit 151 of the trigger device 100 generates a trigger signal and wirelessly transmits the trigger signal via the transmission antenna 141. When the detecting circuit 36 of the transmitter 30 to which the antenna unit 110 is brought close detects the trigger signal with the reception antenna 37, the detecting circuit 36 sends a signal indicating the detection of the trigger signal to the transmission controller 31.

The transmission controller 31 then controls the pressure sensor 32 and the temperature sensor 33 to measure the air pressure data and the temperature data, respectively. The pressure sensor 32 and the temperature sensor 33 transmit the measured air pressure data and the temperature data to the transmission controller 31.

Each transmission controller 31 sends the air pressure data, the temperature data, and the registered ID code to a transmission circuit 34. The transmission circuit 34 encodes and modulates the data sent from the transmission controller 31. The transmission circuit 34 then wirelessly sends the data through the transmission antenna 35.

When the reception circuit 152 of the trigger device 100 receives the data wirelessly transmitted from the transmitter 30 with the reception antenna 144, the control portion 150 displays, on the liquid crystal panel 132, the ID code and the data regarding the tire 20 included in the received data, such as the air pressure data, the temperature data, and the data indicating the position of the tire 20. If the received data, for example, the pressure data or the temperature data exceeds a tolerable range set in advance, the control portion 150 causes the buzzer 154 to sound a warning. The control portion 150 transmits the received data to the memory 153. The memory 153 stores the ID code and the data regarding the tire 20 included in the received data, for example, the air pressure data, the temperature data, and the data indicating the position of the tire 20.

When a predetermined manipulation is performed on the keyboard 131, the control portion 150 reads the ID code and the data regarding the tire 20 stored in the memory 153, for example, the air pressure data, the temperature data, and the data indicating the position of the tire 20. The control portion 150 transmits the data to the external device, such as a personal computer, via the connector 134. The trigger device 100 receives data regarding the tire 20, for example, the data indicating the tolerable ranges of the air pressure and the temperature of the tire 20, from the external device via the connector 134.

The preferred embodiment provides the following advantages.

(1) The trigger device 100 includes the antenna unit 110, the support portion 120, and the main body 130. The antenna unit 110 integrally accommodates the transmission antenna 141, which wirelessly transmits a trigger signal to each transmitter 30, and the reception antenna 144, which receives data wirelessly transmitted from the transmitter 30 based on detection of the trigger signal. The screw 119 is tightened to the threaded bores 117, 122 so that the antenna unit 110 is rotatably supported by the support portion 120. Therefore, the antenna unit 110 can be brought close to the transmitter 30 in the rear inner tire 20 (RRI), which is located inward of the rear tire 20 (RR) provided with a double tire. As a result, the transmitter 30 detects a trigger signal wirelessly transmitted from the transmission antenna 141 and wirelessly transmits the ID code and the data regarding the tire 20 in response to the detection of the trigger signal. Therefore, the trigger device 100 reliably receives the ID code and the data regarding the tire 20 via the reception antenna 144. When the trigger device 100 detects data from one of the transmitters 30 in the right rear tire 20 provided with a double tire, if the trigger device 100 receives data from the transmitter 30 in the tire 20 that is other than the tire 20 to which the antenna unit 110 is brought close, the sensitivity of the reception circuit 152 of the trigger device 100 is adjusted.

(2) The mirrors 113, 114 are attached to the opposing outer surfaces of the antenna unit 110. The mirrors 113, 114 are located at portions of the outer surface of the antenna unit 110 that change the direction in accordance with the rotation of the antenna unit 110. That is, the mirrors 113, 114 have reflective surfaces that are parallel to the rotational axis of the antenna unit 110. In other words, the mirrors 113, 114 are attached to the outer surfaces of the antenna unit 110 in the rotation direction of the antenna unit 110. Therefore, when the antenna unit 110 is located between the rear inner tire 20 (RRI) and the rear outer tire 20 (RRO), damages on the tires 20 can be checked while checking the position of the antenna unit 110. Accordingly, using the trigger device 100, the appearance of the tires 20 can be visually checked besides obtaining the ID code and the data regarding the tire 20. In addition, the presence of the valve cap of the rear inner tire 20 (RRI) can be checked using the mirrors 113, 114 attached to the antenna unit 110.

(3) The trigger device 100 wirelessly transmits a trigger signal via the transmission antenna 141. The transmitter 30 wirelessly transmits data regarding the tire 20 via the transmission antenna 35 in response to the detection of the trigger signal. The trigger device 100 receives data regarding the tire 20 wirelessly transmitted from the transmitters 30 through the reception antenna 144. Therefore, an experiment can be performed on each transmitter 30 using the trigger device 100 before the transmitter 30 is attached to the associated tire 20. That is, an experiment can be performed on each transmitter 30 by itself without taking into consideration of the influence of the tire 20, the wheel 21, or the body frame 11. Therefore, the trigger device 100 is a very convenient device for performing an experiment to evaluate the basic performance of each transmitter 30.

(4) When the trigger device 100 receives the data wirelessly transmitted from the transmitter 30, the control portion 150 displays, on the liquid crystal panel 132, the ID code and the data regarding the tire 20 included in the received data, such as the air pressure data, the temperature data, and the data indicating the position of the tire 20. If the received data, for example, the pressure data or the temperature data exceeds the tolerable range set in advance, the control portion 150 causes the buzzer 154 to sound a warning. Therefore, if the air pressure data or the temperature data exceeds the tolerable range, the operator can visually and aurally check this circumstance. Thus, even if the operator of the trigger device 100 is not looking at the liquid crystal panel 132, the operator can become aware that the air pressure data or the temperature data exceeds the tolerable range.

(5) When a predetermined manipulation is performed on the keyboard 131, the control portion 150 reads the ID code and the data regarding the tire 20 stored in the memory 153, for example, the air pressure data, the temperature data, and the data indicating the position of the tire 20. The control portion 150 transmits the data to the external device, such as a personal computer, via the connector 134. On the other hand, the trigger device 100 receives data regarding the tire 20, for example, the data indicating the tolerable ranges of the air pressure and the temperature of the tire 20, from the external device via the connector 134. The connector 134 facilitates transmission of data between the trigger device 100 and the external device. It is therefore possible to edit the data regarding the tire 20 obtained by the trigger device 100 or to make a list or a graph of the data using the external device. In addition, the data can be printed on a paper by transferring the data regarding the tire 20 to a printer from the external device.

The invention may be embodied in the following forms.

Based on the input from the keyboard 131 or the instruction from the control portion 150, the date and the time of when the trigger device 100 is used may be displayed on the liquid crystal panel 132 with the data regarding the tire 20. The input data may be stored in the memory 153.

Based on the input from the keyboard 131, a user code (for example, a code indicating the manufacturer or the size of the tire 20) and the index number of the vehicle may be displayed on the liquid crystal panel 132. The input data may be stored in the memory 153.

The trigger device 100 may be applied to typical four-wheeled vehicles 10 (for example, a light car and a passenger car), two-wheeled bicycles or motorbikes, or industrial vehicles equipped with the tires 20 (for example, forklifts).

The tolerable ranges of the air pressure data and the temperature data are preferably set in advance based on the input from the keyboard 131 or the input from the external device via the connector 134. In this case, the tolerable ranges can be set in accordance with the type of the vehicle. This increases the types of vehicle the trigger device 100 can be used.

If the reception antenna 144 of the trigger device 100 does not receive the data wirelessly transmitted from the transmitter 30 to which the antenna unit 110 is held close within a predetermined time after a trigger signal is wirelessly transmitted from the transmission antenna 141 of the trigger device 100, the control portion 150 may cause the buzzer 154 to sound a warning. A sentence indicating the above circumstance may be displayed on the liquid crystal panel 132. Alternatively, the display indicating the above circumstance may be designed to blink. In this case, the operator determines that there is a possibility that the trigger signal wirelessly transmitted from the transmission antenna 141 is not received by the transmitter 30. The operator can then change the position of the antenna unit 110 and wirelessly transmit a trigger signal again. Therefore, the operator can determine whether the antenna unit 110 is located at an appropriate position.

A trigger key for wirelessly transmitting a trigger signal may be provided on the trigger device 100.

One of the mirrors 113, 114 may be omitted.

After an ID code is entered from the keyboard 131, the trigger device 100 may wirelessly transmit the entered ID code with a trigger signal. The transmitter 30 may store the ID code in the internal memory after detecting the ID code with the trigger signal by the detecting circuit 36. In this case, the operator can register the ID code on the transmitter 30 using the trigger device 100. As is obvious from the illustrated embodiment, the ID code of the transmitter 30 can be checked with the trigger device 100.

In the preferred embodiment, the inclination angle of the antenna unit 110 with respect to the support portion 120 can be freely adjusted. However, the angle of the antenna unit 110 may be adjusted by 15 degrees at a time.

When the air pressure data or the temperature data exceeds the tolerable range, the numerals displayed on the liquid crystal panel 132 may be designed to blink. Alternatively, a sentence indicating that the air pressure data or the temperature data exceeds the tolerable range may be displayed on the liquid crystal panel 132 or the display may be designed to blink.

In the above embodiment, the cable 135 connects the main body 130 to the antenna unit 110 passing through the support portion 120. However, the cable 135 may connect the main body 130 to the antenna unit 110 without passing through the support portion 120.

The invention claimed is:

1. A trigger device for a tire condition monitoring apparatus, wherein the monitoring apparatus includes a transmitter located in a tire of a vehicle, the trigger device comprising:
   a transmission antenna for wirelessly transmitting a trigger signal, the transmitter wirelessly transmits data indicating the tire condition in response to the trigger signal;
   a reception antenna for receiving the data wirelessly transmitted from the transmitter;
   an antenna unit, which incorporates the transmission antenna and the reception antenna;
   a support portion, which rotatably supports the antenna unit; and
   a mirror located at a portion of the outer surface of the antenna unit that changes the direction in accordance with the rotation of the antenna unit.

2. The trigger device according to claim 1, further comprising:
   a main body, which is connected to the antenna unit, wherein the main body includes a circuit for generating the trigger signal and processing the data received from the transmitter; and
   a rod-like support portion, which can be held by an operator, the antenna unit is rotatably supported at the distal end of the support portion.

3. The trigger device according to claim 2, wherein a cable extends between the antenna unit and the main body, and the antenna unit and the support portion can be moved apart from the main body.

4. The trigger device according to claim 2, wherein the main body includes a connector to be connected to an external device.

5. A trigger device for a tire condition monitoring apparatus, wherein the monitoring apparatus includes a transmitter located in a tire of a vehicle, the trigger device comprising:
   a transmission antenna for wirelessly transmitting a trigger signal, the transmitter wirelessly transmits data indicating the tire condition in response to the trigger signal;
   a reception antenna for receiving the data wirelessly transmitted from the transmitter;
   an antenna unit, which incorporates the transmission antenna and the reception antenna;
   a support portion, which rotatably supports the antenna unit; and
   a mirror having a reflective surface that is parallel to the rotational axis of the antenna unit, wherein the mirror is located on the outer surface of the antenna unit.

6. The trigger device according to claim 1, further comprising an informing device, which performs an informing operation when the tire condition is determined to be abnormal based on the data received by the reception antenna.

7. The trigger device according to claim 1, wherein the main body includes an informing device, which performs an informing operation when the reception antenna does not receive data from the transmitter within a predetermined time after a trigger signal is wirelessly transmitted from the transmission antenna.

8. The trigger device according to claim 1, wherein the trigger device is portable.

9. The trigger device according to claim 1, wherein the transmission antenna transmits a long wave and the reception antenna receives a short wave.

10. A trigger device for a tire condition monitoring apparatus, wherein the monitoring apparatus includes a transmitter located in a tire of a vehicle, the trigger device comprising:
   a transmission antenna for wirelessly transmitting a trigger signal, the transmitter wirelessly transmits data indicating the tire condition in response to the trigger signal;
   a reception antenna for receiving data wirelessly transmitted from the transmitter;
   an antenna unit, which incorporates the transmission antenna and the reception antenna;
   a main body, which is connected to the antenna unit, the main body includes a circuit for generating the trigger signal and processing the data received from the transmitter; and a rod-like support portion, which can be held by an operator, the antenna unit is rotatably supported at the distal end of the support portion;

a mirror located at a portion of the outer surface of the antenna unit that changes the direction in accordance with the rotation of the antenna unit.

11. The trigger device according to claim 10, wherein a cable extends between the antenna unit and the main body, and the antenna unit and the support portion can be moved from the main body.

12. The trigger device according to claim 10, wherein the main body includes a connector to be connected to an external device.

13. A trigger device for a tire condition monitoring apparatus, wherein the monitoring apparatus includes a transmitter located in a tire of a vehicle, the trigger device comprising:

a transmission antenna for wirelessly transmitting a trigger signal, the transmitter wirelessly transmits data indicating the tire condition in response to the trigger signal;

a reception antenna for receiving data wirelessly transmitted from the transmitter;

an antenna unit, which incorporates the transmission antenna and the reception antenna;

a main body, which is connected to the antenna unit, the main body includes a circuit for generating the trigger signal and processing the data received from the transmitter; and a rod-like support portion, which can be held by an operator, the antenna unit is rotatably supported at the distal end of the support portion;

a mirror having a reflective surface that is parallel to the rotational axis of the antenna unit, wherein the mirror is located on the outer surface of the antenna unit.

* * * * *